(12) United States Patent
McClure

(10) Patent No.: US 11,596,105 B2
(45) Date of Patent: Mar. 7, 2023

(54) DRIVE SYSTEM FOR AN AGRICULTURAL BALER

(71) Applicant: CNH Industrial America LLC, New Holland, PA (US)

(72) Inventor: John R. McClure, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 686 days.

(21) Appl. No.: 16/669,703

(22) Filed: Oct. 31, 2019

(65) Prior Publication Data

US 2021/0127581 A1 May 6, 2021

Related U.S. Application Data

(63) Continuation-in-part of application No. 16/669,133, filed on Oct. 30, 2019.

(51) Int. Cl.

| | |
|---|---|
| *A01D 89/00* | (2006.01) |
| *A01F 15/07* | (2006.01) |
| *F16D 13/10* | (2006.01) |
| *A01F 15/08* | (2006.01) |
| *B30B 9/30* | (2006.01) |

(Continued)

(52) U.S. Cl.
CPC ......... *A01D 89/005* (2013.01); *A01D 89/002* (2013.01); *A01D 89/006* (2013.01); *A01F 15/07* (2013.01); *A01F 15/085* (2013.01); *F16D 13/10* (2013.01); *A01F 15/0833* (2013.01);

(Continued)

(58) Field of Classification Search
CPC .......... F16D 13/10; F16D 49/10; F16D 65/58; B30B 9/30; A01F 15/085; A01F 15/106; A01F 15/0833; A01F 15/07; A01D 89/006; A01D 89/005; A01D 89/002
See application file for complete search history.

(56) References Cited

U.S. PATENT DOCUMENTS

| | | |
|---|---|---|
| 6,073,426 A | 6/2000 | Mesmer et al. |
| 6,233,913 B1 | 5/2001 | Roth et al. |

(Continued)

FOREIGN PATENT DOCUMENTS

| | | |
|---|---|---|
| CN | 204186838 U | 3/2015 |
| CN | 205726897 U | 11/2016 |

(Continued)

*Primary Examiner* — Arpad F Kovacs
(74) *Attorney, Agent, or Firm* — Peter Zacharias; Patrick Sheldrake

(57) ABSTRACT

A drive system for an agricultural baler that includes a power take off (PTO) shaft configured for being operably connected in between an agricultural vehicle and the agricultural baler and for supplying motive power to the agricultural baler, a gearbox configured for being mounted on the agricultural baler and connected to the PTO shaft for receiving motive power from the PTO shaft, a pickup drive shaft operably connected to the gearbox and configured for being operably connected to a reel of a pickup unit of the agricultural baler, at least one sensor associated with the pickup drive shaft and configured for sensing a rotational movement of the pickup drive shaft, and an electrical processing circuit operably connected to the at least one sensor. The electrical processing circuit is configured for disconnecting motive power to the reel.

20 Claims, 2 Drawing Sheets

(51) Int. Cl.
*F16D 65/58* (2006.01)
*F16D 49/10* (2006.01)

(52) U.S. Cl.
CPC ............... *B30B 9/30* (2013.01); *F16D 49/10* (2013.01); *F16D 65/58* (2013.01)

(56) References Cited

U.S. PATENT DOCUMENTS

| | | | |
|---|---|---|---|
| 6,644,005 | B1 | 11/2003 | Grahl et al. |
| 6,644,006 | B1 * | 11/2003 | Merritt .................. A01F 15/106 56/11.2 |
| 6,701,834 | B2 | 3/2004 | Roth |
| 6,925,788 | B2 * | 8/2005 | Nelson .................. A01F 15/085 56/11.2 |
| 6,928,792 | B1 | 8/2005 | Viesselmann et al. |
| 7,669,400 | B2 * | 3/2010 | Naaktgeboren ..... A01F 15/0841 56/341 |
| 7,942,599 | B2 * | 5/2011 | Naaktgeboren ..... A01F 15/0841 464/33 |
| 8,113,114 | B2 | 2/2012 | Schlesser et al. |
| 8,311,709 | B2 | 11/2012 | Vanhercke et al. |
| 8,544,243 | B2 | 10/2013 | Herron et al. |
| 8,577,559 | B2 | 11/2013 | Hel et al. |
| 2016/0235007 | A1 * | 8/2016 | Hoffmann ........... A01F 15/0715 |
| 2018/0242528 | A1 | 8/2018 | Rodewald |
| 2019/0055993 | A1 | 2/2019 | Pautz |

FOREIGN PATENT DOCUMENTS

| | | | | |
|---|---|---|---|---|
| DE | 195 38 370 | | 10/1996 | |
| DE | 19701421 | A1 * | 7/1998 | ........... A01F 15/085 |
| DE | 102007031187 | A1 * | 1/2009 | ......... A01F 15/0833 |
| DE | 202011001967 | U1 * | 4/2011 | ......... A01D 89/005 |
| EP | 1205102 | A2 * | 5/2002 | ........... A01F 15/071 |
| EP | 1228682 | A2 * | 8/2002 | ........... A01F 15/085 |
| EP | 2 225 926 | A1 | 9/2010 | |
| EP | 2982235 | B1 * | 8/2017 | ......... A01F 15/0715 |
| EP | 3366110 | A1 * | 8/2018 | ......... A01F 15/0715 |
| EP | 3818810 | A1 * | 5/2021 | ......... A01D 89/002 |
| JP | 2020043829 | A * | 3/2020 | ............. A01F 15/07 |
| KR | 101338492 | B1 * | 12/2013 | ............. A01F 15/08 |
| WO | WO-2013057114 | A1 * | 4/2013 | ......... A01F 15/0841 |
| WO | 2013/124836 | A1 | 8/2013 | |
| WO | 2013/152991 | A1 | 10/2013 | |
| WO | WO-2015065173 | A1 * | 5/2015 | ......... A01F 15/0715 |

\* cited by examiner

DRIVE SYSTEM FOR AN AGRICULTURAL BALER

BACKGROUND OF THE INVENTION

The present invention pertains to agricultural balers and, more specifically, to a drive system for an agricultural baler.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a frame, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The pickup unit of a round baler may include tine bars and multiple tines attached to the tine bars for picking up the crop material from the field. The pickup unit may also include a driveline that is operably connected in between the power take off (PTO) shaft of the tractor, or other agricultural vehicle, and the tine bars. Thus, the driveline transmits the power from the PTO shaft in order to rotate the tine bars and tines attached thereto.

To protect the pickup unit from damage during a torque overload, for example when a foreign object or a sudden and large accumulation of crop material enters the pickup unit, operating power to the pickup unit may be cut off. For instance, a pickup unit of a baler may additionally include a radial pin, shear bolt, or overrunning clutch configuration which operably disconnects the driveline of the pickup unit from the PTO shaft. Generally, once the pickup unit has stopped, the operator must remove the foreign object or jammed crop material. It may be time-consuming and arduous to reset or re-engage power to the pickup unit. For example, replacing shear bolts can be a time-consuming process. Furthermore, various concerns may arise if operating power is undesirably applied to the pickup unit when the operator is still in the midst of cleaning out or resetting the pickup unit. Hence, it may be desirable, and even required by some regulatory standards, to only reengage operating power the pickup unit upon manual intervention by the operator.

What is needed in the art is a cost-effective and efficient drive system for protecting the pickup unit as well as the operator.

SUMMARY OF THE INVENTION

In one exemplary embodiment formed in accordance with the present invention, there is provided a drive system for an agricultural vehicle and an agricultural baler that has a pickup unit with a reel. The drive system includes a PTO shaft, a gearbox mounted on the agricultural baler and connected to the PTO shaft, a pickup drive shaft operably connected to the gearbox, at least one sensor associated with the pickup drive shaft and configured for sensing a rotational movement of the pickup drive shaft to directly or indirectly sense the torque through the pickup drive shaft, and an electrical processing circuit operably connected to the at least one sensor. The drive system may also include a clutch, with a pawl and an actuator, that is attached to the PTO shaft for stopping the rotational movement of the PTO shaft. The electrical processing circuit may accordingly stop the PTO shaft, by electronically cutting power to the PTO shaft or engaging the pawl on the designated PTO clutch, in order to disconnect motive power to the reel upon an overloading of the pickup unit so that the reel may be subsequently manually rotated if desired.

In another exemplary embodiment formed in accordance with the present invention, there is provided a drive system for an agricultural vehicle and an agricultural baler that has a pickup unit with a reel. The drive system includes a PTO shaft configured for being operably connected in between the agricultural vehicle and the agricultural baler and for supplying motive power to the agricultural baler, a gearbox configured for being mounted on the agricultural baler and connected to the PTO shaft for receiving motive power from the PTO shaft, a pickup drive shaft operably connected to the gearbox and configured for being operably connected to the reel, at least one sensor associated with the pickup drive shaft and configured for sensing a rotational movement of the pickup drive shaft, and an electrical processing circuit operably connected to the at least one sensor. The electrical processing circuit is configured for disconnecting motive power to the reel.

In yet another exemplary embodiment formed in accordance with the present invention, there is provided a baling assembly for baling a crop material that includes an agricultural vehicle. The agricultural vehicle includes a frame, and a PTO shaft configured for providing motive power. The baling assembly also includes an agricultural baler. The agricultural baler includes a main bale chamber configured for forming a bale and a pickup unit located upstream of the main bale chamber. The pickup unit includes a reel with a plurality of tines configured for lifting the crop material from a field. The reel is rotatable in an operating direction and a reverse direction. The baling assembly further includes a drive system for the agricultural vehicle and the agricultural baler. The drive system includes a gearbox mounted on the agricultural baler and connected to the PTO shaft of the agricultural vehicle. The gearbox is configured for receiving motive power from the PTO shaft. The drive system also includes a pickup drive shaft operably connected to the gearbox and configured for being operably connected to the reel, at least one sensor associated with the pickup drive shaft and configured for sensing a rotational movement of the pickup drive shaft, and an electrical processing circuit operably connected to the at least one sensor. The electrical processing circuit is configured for disconnecting motive power to the reel.

In yet another exemplary embodiment formed in accordance with the present invention, there is provided a method for baling a crop material. The method includes an initial step of providing a drive system for an agricultural baler that includes a power take off (PTO) shaft configured for being operably connected in between an agricultural vehicle and the agricultural baler and for supplying motive power to the agricultural baler and a gearbox configured for being mounted on the agricultural baler and connected to the PTO shaft for receiving motive power from the PTO shaft. The drive system also includes a pickup drive shaft operably connected to the gearbox and configured for being operably connected to a reel of a pickup unit of the agricultural baler, at least one sensor associated with the pickup drive shaft, and an electrical processing circuit operably connected to the at least one sensor. The method also includes the steps of operating the agricultural baler to pick up and bale the crop material, sensing, by the at least one sensor, a rotational movement of the pickup drive shaft, and stopping the rotational movement of the PTO shaft, by the electrical processing circuit, to disconnect motive power to the reel upon an overloading of the pickup unit so that the reel is manually rotatable in an operating direction and a reverse direction of the reel.

One possible advantage of the exemplary embodiment of the agricultural baler is that the drive system shuts down the entire pickup unit by stopping the PTO shaft if the reel becomes overloaded by an excess amount of crop material or a foreign object.

Another possible advantage of the exemplary embodiment of the agricultural baler is that the reel does not automatically reengage without manual intervention of the operator to restart the PTO shaft, and thus the operator may rotate the reel in its operating direction without resetting the reel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
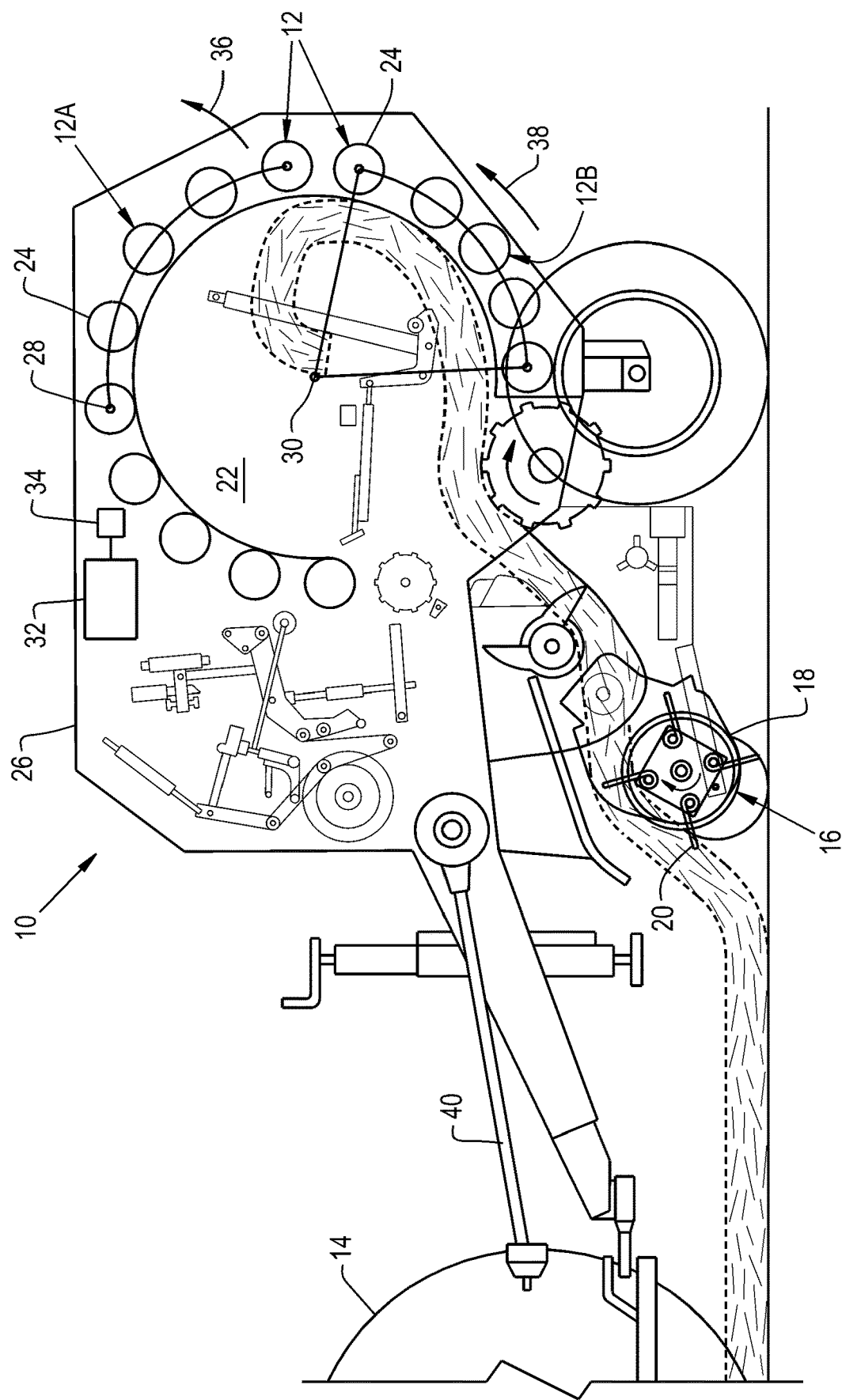
FIG. 1 illustrates a side cross-sectional view of an agricultural vehicle and an agricultural baler that has a pickup unit and a bale chamber, in accordance with an exemplary embodiment of the present invention.

Referring now to the drawings, and more particularly to FIG. 1, there is shown a cross-sectional, side view of a round baler 10 which may be towed by an agricultural vehicle 14, such as a tractor 14. The baler 10 is coupled to a power take off (PTO) shaft 40 of the agricultural vehicle 14. Alternatively, the round baler 10 may be a self-propelled baler.

Crop material is lifted from windrows into the baler 10 by a pickup unit 16. The pickup unit 16 includes a rotating pickup reel 18 with tine bars and tines 20, which move the crop rearward toward a bale chamber 22. The reel 18 is rotatable in an operating direction for lifting the crop material off of the ground and a reverse direction, i.e., opposite to the operating direction. In general, the crop material is rolled into a bale of a predetermined size within the bale chamber 22, and then is discharged through a tail gate arrangement 12 onto the field, where it is subsequently picked up for transport.

The bale chamber 22 is configured as an expandable bale chamber 22 with a plurality of carrier elements 24 carried by a frame 26. The carrier elements 24 are arranged in an arcuate arrangement around the bale chamber 22, and function to engage and roll the expanding bale as the crop material is fed into the bale chamber 22. In the illustrated embodiment, the carrier elements 24 are configured as rollers. However, the carrier elements can be variously formed, such as rollers, chains and slats, and/or belts.

The carrier elements 24 may be paired with an upper tail gate arrangement 12A and a lower tail gate arrangement 12B. The upper tail gate arrangement 12A has a first pivot axis 28, and the lower tail gate arrangement 12B has a second pivot axis 30. The upper and lower tail gate arrangements 12A, 12B may rotate to open the bale chamber 22 for accordingly allowing the wrapped bale to be ejected.

The agricultural baler 10 can further include an electrical processing circuit 32 which is configured for carrying out a bale discharge operation using the upper tail gate arrangement 12A and the lower tail gate arrangement 12B. The electrical processing circuit 32 can carry out the bale discharge operation, based on the following discharge sequence. The electrical processing circuit 32 may first sense a full bale condition within the bale chamber 22 using an appropriate sensor 34, corresponding to a predetermined size of the bale within the bale chamber 22. Then the upper tail gate arrangement 12A may be opened by pivoting the upper tail gate arrangement 12A about the first pivot axis 28 to an open position (in an upward direction, as shown by directional arrow 36 in FIG. 1). Next, the bale may be ejected by pivoting the lower tail gate arrangement 12B about the second pivot axis 30 to an eject position (counter-clockwise in an upward direction, as shown by directional arrow 38 in FIG. 1). It should be appreciated that the electrical processing circuit 32 is coupled with suitable actuators (not shown), which are in turn coupled with the upper tail gate arrangement 12A and the lower tail gate arrangement 12B, for pivoting the upper tail gate arrangement 12A and the lower tail gate arrangement 12B about their respective pivot axis 28, 30. The discharge sequence can further include the step of wrapping the bale with a wrapping material (e.g., mesh or twine), after the full bale condition is sensed and prior to opening the upper tail gate arrangement 12A. To further decrease the bale discharge time, the upper tail gate arrangement 12A can be opened when the wrapping step is partially completed. In particular, the upper tail gate arrangement 12A can be opened when the bale has been wrapped with at least one full revolution of wrapping material.

Figure 2:
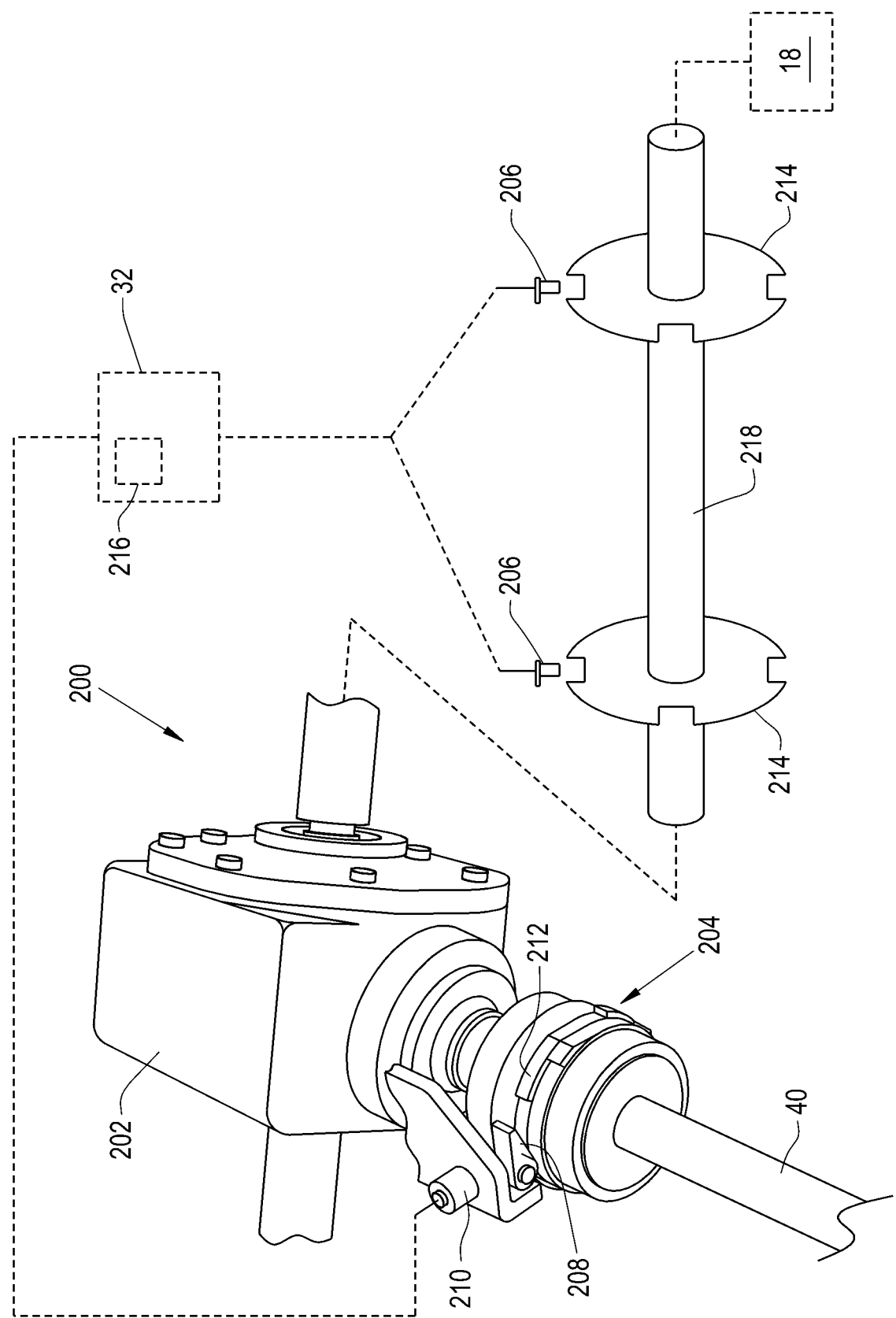
FIG. 2 illustrates a perspective view of a drive system for the agricultural vehicle and the agricultural baler of FIG. 1, the drive system automatically disconnects motive power to the agricultural baler upon an overload of the pickup unit, in accordance with an exemplary embodiment of the present invention.

Referring now collectively to FIGS. 1-2, there is shown a drive system 200 for the agricultural vehicle 14 and the agricultural baler 10. The drive system 200 generally includes a gearbox 202 operably coupled to the PTO shaft 40 of the agricultural vehicle 14 and various intervening gears, sprockets, shafts, and/or conveying members for transmitting motive power from the PTO shaft 40 to the reel 18. For instance, the drive system 200 may include a pickup driveshaft 218 which is operably connected in between the gearbox 202 and the reel 18. The drive system 200 may further include a clutch 204, at least one sensor 206, and the electrical processing circuit 32 which is operably connected to the clutch 204 and the sensor(s) 206. The electrical processing circuit 32 stops the PTO shaft 40 from rotating in order to disconnect motive power to the reel 18 upon an overloading of the pickup unit 16. An overloading of the pickup unit 16 may occur when the pickup unit 16 receives an excess amount of crop material and/or a foreign object, such as a rock, which may plug, jam, or damage the pickup unit 16. Then, after motive power has been cut off from the baler 10 entirely, the operator may cleanout or unplug the reel 18, for instance by removing crop material and/or rotating the reel 18 in its operating or reverse directions, without concern of a reengagement of the reel 18. Thereby, the drive system 200 may dually stop the pickup unit 16 in the event of an overload and prevent the pickup unit 16 from resetting. Hence, the drive system 200 may fulfill various safety desires or requirements, which may require that the pickup unit 16 cannot reset without manual intervention.

The gearbox 202 is attached to and supported by the frame 26 of the baler 10. The gearbox 202 may be operably coupled to the PTO shaft 40 and the drive shaft 218 of the pickup unit 16. The gearbox 202 may be in the form of any desired gearbox 202.

The clutch 204 is operably connected in between the PTO shaft 40 and the gearbox 202, and the clutch 204 is also operably connected to the electrical processing circuit 34. Alternatively, it is conceivable to operably connect the clutch 204 between the PTO shaft 40 and the agricultural vehicle 14. The clutch 204 functions to transfer or disconnect motive power between the PTO shaft 40 and the gearbox 202. The clutch 204 may have a rotation side and a nonrotation side. The clutch 204 includes a pawl 208, an actuator 210, and a protrusion 212 on its rotation side.

The pawl 208 may be pivotally connected to a frame member of the clutch 204. As can be appreciated, the pawl 208 may be mounted adjacent to the clutch 204 and/or PTO shaft 40 at any desired location. The pawl 208 may have a protruded end for contacting the protrusion 212 and an opposite bulbous end with mounting features for pivotally mounting the frame member of the clutch 204. However, the pawl 208 may be in the form of any desired pawl with any desired shape, size, and material. The actuator 210 may be in the form of an electric or hydraulic motor, a biasing member, and/or an electric, hydraulic, or pneumatic piston. As shown, the actuator 210 is in the form of a servo motor 210 which is operably connected to and controlled by the electrical processing circuit 32. The protrusion 212 may be in the form of a raised member located on the outer periphery of the clutch 204. It should be appreciated that the protrusion 212 may conversely be in the form of a notch or cutout. Furthermore, the clutch 204 may be in the form of any desired clutch capable of engaging with any desired pawl.

Each sensor 206 is associated with and mounted adjacent to the drive shaft 218. Each sensor 206 is also operably connected to the electrical processing circuit 32. The one or more sensors 206 may be in the form of a speed sensor and/or a load sensor for indirectly or directly measuring the torque on the drive shaft 218 which is indicative of the loading of the pickup unit 16. In the present exemplary embodiment, each sensor 206 is an optical speed sensor 206 for measuring the speed of the drive shaft 218; and more particularly, a respective target 214, for example a notched disc, mounted on the drive shaft 218. However, it should be appreciated that the one or more speed sensors may be in the form of any desired sensors. As shown, the drive system 200 includes two speed sensors 206 respectively mounted at two different locations, which are axially spaced apart relative to the longitudinal axis of the drive shaft 218, for measuring a shaft twist of the drive shaft 218 at the two separate locations at which the targets 214 are mounted. The torque of the drive shaft 218 is then derivable from the measured shaft twist. For instance, the speed sensors 206 may measure changes in the phase relationship between the two targets 214, and the electrical processing circuit 32 may then measure the phase changes and calculate the torque through the drive shaft 218. The shaft twist may be between 3-10 degrees at maximum engine torque.

It should be appreciated that the length and/or diameter of the drive shaft 218 may be altered as desired to reach a particular range of desired degrees of shaft twist. For example, the drive shaft 218 may have a length of 60 inches (152.4 cm) and a diameter of 0.80 inches (2 cm), which results in 13.9 degrees of twist.

In operation, the operator will start the baling procedure to lift crop material from the field and subsequently bale the crop material. During operation of the baler 10, the one or more sensors 206 may sense a rotational movement of the drive shaft 218, e.g. shaft twist and/or the torque through the drive shaft 218. Once the electrical processing circuit 32 determines the torque of the drive shaft 218, which indicates the loading of the pickup unit 16, the electrical processing circuit 32 may subsequently control the actuator 210 to move the pawl 208 so that the pawl 208 engages with the protrusion 212 and stops the PTO shaft 40 from rotating. Thus, upon the one or more sensors 206 sensing the overloading of the pickup unit 16, motive power to the pickup unit 16 will be shut off, which in turn allows the operator to manually rotate the reel 18 without concern of the pickup unit 16 resetting. The electrical processing circuit 32 may shut down the PTO shaft 40 automatically or upon receiving an input command from the operator after the electrical processing circuit 32 has notified the operator, for example via a visual and/or auditory indicator. The electrical processing circuit 32 may keep the PTO shaft 40 shut down until the operator inputs a corresponding reset command so that the pickup unit 16 only restarts upon manual intervention by the operator.

According to another aspect of an exemplary embodiment of the present invention, the drive system 200 may not include a designated clutch at the PTO shaft 40. Thereby, the drive system 200 may only include the one or more sensors 206 on the drive shaft 218 and the electrical processing circuit 32 such that the electrical procession circuit 32 shuts down motive power to the PTO shaft 40 via software alone. For example, if the agricultural vehicle 14 is equipped with an ISObus connection to the baler 10, then the software of the baler 10 may communicate a shutdown signal to the controller of the agricultural vehicle 14, via CAN data, so that the agricultural vehicle 14 will accordingly cut power to the PTO shaft 40 upon an overloading of the pickup unit 16.

The functionality of the drive system 200 may be incorporated into the electrical processing circuit 32 on the baler and/or the controller of the agricultural vehicle 14. For example, the electrical processing circuit 32 for controlling the functionality of the drive system 200 may be entirely or partially incorporated into the controller of the agricultural vehicle 14. Alternatively, the drive system 200 may have its own designated electrical processing circuit which interfaces with the controllers of the baler 10 and/or agricultural vehicle 14.

It is to be understood that the operation of the drive system 200 may be performed by the electrical processing circuit 32, for example a controller 32, upon loading and executing software code or instructions which are tangibly stored on a tangible computer readable medium 216, such as on a magnetic medium, e.g., a computer hard drive, an optical medium, e.g., an optical disc, solid-state memory, e.g., flash memory, or other storage media known in the art. Thus, any of the functionality performed by the controller 32 described herein is implemented in software code or instructions which are tangibly stored on a tangible computer readable medium. The controller 32 loads the software code or instructions via a direct interface with the computer readable medium or via a wired and/or wireless network. Upon loading and executing such software code or instructions by the controller 32, the controller 32 may perform any of the functionality of the controller 32 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A drive system for an agricultural baler, comprising:
   a power take off (PTO) shaft operably connected in between an agricultural vehicle and the agricultural baler and for supplying motive power to the agricultural baler;
   a gearbox mounted on the agricultural baler and connected to the PTO shaft for receiving motive power from the PTO shaft;
   a pickup drive shaft operably connected to the gearbox and operably connected to a reel of a pickup unit of the agricultural baler;
   at least one sensor associated with the pickup drive shaft, the sensor sensing a rotational movement of the pickup drive shaft;
   an electrical processing circuit operably connected to the at least one sensor, the electrical processing circuit being configured for disconnecting motive power to the reel; and
   a clutch operably connected in between the PTO shaft and the gearbox, the clutch is operably connected to the electrical processing circuit, and the clutch is configured for one of transferring motive power from the PTO shaft to the gearbox and disconnecting motive power to the gearbox, wherein the clutch includes:
   a pawl; and
   an actuator connected to the pawl, the actuator being operably connected to the electrical processing circuit and to the pawl, when the actuator is actuated by the electrical processing circuit the pawl is moved to stop the rotational movement of the PTO shaft.

2. The drive system of claim 1, wherein the electrical processing circuit is configured for stopping the rotational movement of the PTO shaft to disconnect motive power to the reel upon an overloading of the pickup unit so that the reel is manually rotatable in an operating direction and a reverse direction of the reel.

3. The drive system of claim 1, wherein the clutch further includes a protrusion on a rotational side of the clutch, the pawl contacting the protrusion when actuated by the actuator thereby stopping the rotational movement of the PTO shaft.

4. The drive system of claim 3, wherein the pawl has a protruded end and an opposite bulbous end, the protruded end of the pawl contacting the protrusion when actuated by the actuator.

5. The drive system of claim 4, wherein the electrical processing circuit is configured for controlling the actuator to engage the pawl to stop the rotational movement of the PTO shaft upon the at least one sensor sensing an overloading of the pickup unit so that the reel is manually rotatable as the PTO shaft remains connected to the gearbox.

6. The drive system of claim 1, wherein the at least one sensor is configured for measuring a torque of the pickup drive shaft which is indicative of a loading of the pickup unit.

7. The drive system of claim 6, wherein the at least one sensor comprises a first sensor associated with the pickup drive shaft at a first location and a second sensor associated with the pickup drive shaft at a second location which is, relative to the pickup drive shaft, axially spaced apart from the first location, and wherein the first sensor and the second sensor are configured for measuring a shaft twist of the pickup drive shaft such that the torque of the pickup drive shaft is derivable therefrom by the electrical processing circuit.

8. The drive system of claim 7, wherein the first sensor is in the form of a first speed sensor and the second sensor is in the form of a second speed sensor.

9. The drive system of claim 7, wherein the pickup drive shaft comprises a first target and a second target respectively located at the first location and the second location of the pickup drive shaft, and the first sensor and the second sensor are configured for respectively sensing the first target and the second target.

10. A baling assembly for baling a crop material, comprising:
    an agricultural vehicle, comprising:
    a frame; and
    a power take off (PTO) shaft configured for providing motive power;
    an agricultural baler, comprising:
    a main bale chamber configured for forming a bale;
    a pickup unit located upstream of the main bale chamber and comprising a reel with a plurality of tines configured for lifting the crop material from a field, the reel is rotatable in an operating direction and a reverse direction, and a pickup drive shaft operably connected to the reel; and a drive system for the agricultural vehicle and the agricultural baler, the drive system comprising:
  a gearbox mounted on the agricultural baler and connected to the PTO shaft of the agricultural vehicle, the gearbox is configured for receiving motive power from the PTO shaft, and the gearbox is operably connected to the pickup drive shaft;
  at least one sensor associated with the pickup drive shaft and configured for sensing a rotational movement of the pickup drive shaft;
  an electrical processing circuit operably connected to the at least one sensor and configured for disconnecting motive power to the reel; and
  a clutch operably connected in between the PTO shaft and the gearbox, the clutch is operably connected to the electrical processing circuit, and the clutch is configured for one of transferring motive power from the PTO shaft to the gearbox and disconnecting motive power to the gearbox, wherein the clutch includes:
    a pawl; and
    an actuator connected to the pawl, the actuator being operably connected to the electrical processing circuit and to the pawl, when the actuator is actuated by the electrical processing circuit the pawl is moved to stop the rotational movement of the PTO shaft.

11. The baling assembly of claim 10, wherein the electrical processing circuit is configured for stopping the rotational movement of the PTO shaft to disconnect motive power to the reel upon an overloading of the pickup unit so that the reel is manually rotatable in the operating direction and the reverse direction of the reel.

12. The baling assembly of claim 10, wherein the clutch further includes a protrusion on a rotational side of the clutch, the pawl contacting the protrusion when actuated by the actuator thereby stopping the rotational movement of the PTO shaft.

13. The baling assembly of claim 12, wherein the pawl has a protruded end and an opposite bulbous end, the protruded end of the pawl contacting the protrusion when actuated by the actuator.

14. The baling assembly of claim 13, wherein the electrical processing circuit is configured for controlling the actuator to engage the pawl to stop the rotational movement of the PTO shaft upon the at least one sensor sensing an overloading of the pickup unit so that the reel is manually rotatable as the PTO shaft remains connected to the gearbox.

15. The baling assembly of claim 10, wherein the at least one sensor is configured for measuring a torque of the drive shaft which is indicative of a loading of the pickup unit.

16. The baling assembly of claim 15, wherein the at least one sensor comprises a first sensor associated with the pickup drive shaft at a first location and a second sensor associated with the pickup drive shaft at a second location which is, relative to the pickup drive shaft, axially spaced apart from the first location, and wherein the first sensor and the second sensor are configured for measuring a shaft twist of the pickup drive shaft such that the torque of the pickup drive shaft is derivable therefrom by the electrical processing circuit.

17. The baling assembly of claim 16, wherein the first sensor is in the form of a first speed sensor and the second sensor is in the form of a second speed sensor.

18. The baling assembly of claim 16, wherein the pickup drive shaft comprises a first target and a second target respectively located at the first location and the second location of the pickup drive shaft, and the first sensor and the second sensor are configured for respectively sensing the first target and the second target.

19. A method for baling a crop material, comprising:
  providing a drive system for an agricultural baler comprising a power take off (PTO) shaft configured for being operably connected in between an agricultural vehicle and the agricultural baler and for supplying motive power to the agricultural baler, a gearbox configured for being mounted on the agricultural baler and connected to the PTO shaft for receiving motive power from the PTO shaft, a pickup drive shaft operably connected to the gearbox and configured for being operably connected to a reel of a pickup unit of the agricultural baler, at least one sensor associated with the pickup drive shaft, and an electrical processing circuit operably connected to the at least one sensor;
  operating the agricultural baler to pick up and bale the crop material;
  sensing, by the at least one sensor, a rotational movement of the pickup drive shaft; and
  stopping the rotational movement of the PTO shaft, by the electrical processing circuit, to disconnect motive power to the reel upon an overloading of the pickup unit so that the reel is manually rotatable in an operating direction and a reverse direction of the reel, wherein the drive system further comprises a clutch operably connected in between the PTO shaft and the gearbox, the clutch is operably connected to the electrical processing circuit, and the clutch is configured for one of transferring motive power from the PTO shaft to the gearbox and disconnecting motive power to the gearbox, wherein the clutch includes:
    a pawl; and
    an actuator connected to the pawl, the actuator being operably connected to the electrical processing circuit and to the pawl, when the actuator is actuated by the electrical processing circuit the pawl is moved to stop the rotational movement of the PTO shaft.

20. The method of claim 19, wherein the clutch further includes a protrusion on a rotational side of the clutch, the pawl contacting the protrusion when actuated by the actuator thereby stopping the rotational movement of the PTO shaft.

* * * * *